2,947,871
Patented Aug. 2, 1960

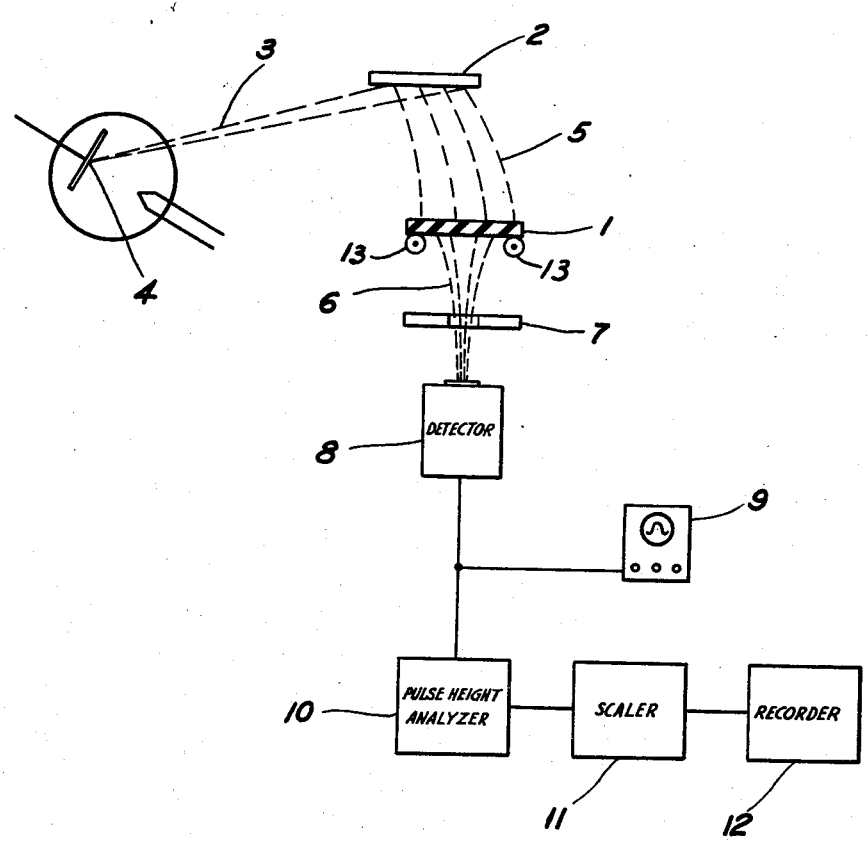

2,947,871

APPARATUS FOR DETERMINING THE COMPOSITION AND THICKNESS OF THIN LAYERS

Herbert Friedman, 2643 N. Upshur St., Arlington, Va.

Filed Aug. 1, 1955, Ser. No. 525,607

9 Claims. (Cl. 250—83.6)

My invention relates to a non-destructive method and apparatus for determining the composition as well as the thickness of thin layers of material particularly by means of X-rays.

In some cases it is not only necessary to determine thickness of a thin layer but its composition as well. Methods for determining thickness by means of X-rays are not particularly adapted to the determination of composition since they depend chiefly on the attenuation of an X-ray beam passing through the layer and yield no information regarding its constitution.

X-ray spectrographic methods for determining the composition of a material are similarly not particularly suited to measuring thickness because they depend upon the excitation of elements in the material to produce X-ray spectra characteristic of each of those elements. Moreover, quantitative determination of the element requires the preparation of a sample of the material and comparison of that sample with a standard of known composition. Thus, the known methods of determining the composition of materials are not particularly suited to the control of composition in a continuous process.

It is a principal object of my invention to provide a method and apparatus for determining both thickness and composition of thin layers.

It is a further object of my invention to provide a method and apparatus for the rapid, non-destructive determination of composition of thin layers by means of X-rays.

It is a still further object of my invention to provide a method and apparatus for the rapid non-destructive determination and control of thickness and composition of thin layers.

It is another object of my invention to provide a method and apparatus for making a quantitative determination of the constitution of a thin layer without preparation of a standard sample thereof.

These and further objects of my invention will appear as the specification progresses.

In accordance with my invention I employ a source of X-radiation which generates an X-ray spectrum having at least two characteristic wave-lengths, one of which lies just above the absorption edge of at least one of the elements in the layer and the other of which lies just below the absorption edge. Thus, the longer wave-length radiation will only be slightly attenuated in its passage through the layer while the shorter wave-length will be greatly attenuated. The ratio of the intensities of the two wave-lengths after passing through the layer will then be a measure of the amount of that element in the layer while the relative intensity of the longer wave-length radiation after passage through the layer will be a measure of the thickness of the layer.

It is possible to determine the ratio of the intensities of the longer and shorter wave-lengths by separating these emergent wave-lengths by means of a monochromator, allowing the separated beams of radiation to impinge on separate portions of a photographic film and measuring the intensity of radiation in each wave-length by measuring the density of exposure of the film due to each of these wave-lengths.

In a particular embodiment of my invention, I prefer to employ a proportional counter or scintillation counter to detect the X-radiation transmitted through the layer. Either of those devices produces electrical pulses, the amplitudes of which are inversely proportional to the emergent wave-lengths and the number of which in a given amplitude interval are proportional to the intensity of the radiation. Thus the number of electrical pulses corresponding to the longer wave-length in a given amplitude interval are directly proportional to the thickness of the layer and the ratio of the number of pulses in a given amplitude interval for both wave-lengths enables a quantitative determination of the constitution of the layer.

In order to facilitate the counting of the number of pulses in a given amplitude interval, it is preferable to employ means to separate pulses of different amplitudes, such a a multi-channel pulse height analyzer and quantize the pulses to eliminate statistical errors resulting from pulses of varying amplitudes in a given interval. Thus, by recording and counting the number of pulses in a given time and amplitude interval a more accurate determination of the intensity of the radiation of that wave-length can be obtained.

As a source of X-radiation a dual target X-ray tube or other dual source yielding X-rays of the desired wave-lengths may be employed. However, I prefer to use as a source a compound having two elements yielding upon exposure to primary X-radiation a fluorescent X-ray spectrum containing wave-lengths characteristic of the elements of the compound at least two of which lie adjacent to and above and below the absorption edge of an element in the layer, respectively. In one of the more important application of this method, i.e., determining the halogen content of thin layers of plastic such as polyvinyl chloride, copolymers of polyvinyl chloride and polyvinylidene chloride, or chlorinated rubbers such as rubber hydrochloride and polychloroprene, I prefer to use a crystal of potassium chloride which is exposed to radiation from a copper target of an X-ray tube.

The invention will now be described with reference to the accompanying drawing which shows an apparatus for carrying out the method according to the invention.

A thin sheet 1 of polyvinyl chloride, supported in a conventional manner, for example, by rollers 13 if a continuous strip is to be analyzed, is exposed to the fluorescent X-ray spectrum 5 produced by a crystal 2 of KCl which is obtained by exposing the crystal to primary X-radiation 3 produced by a copper target 4 of X-ray tube operated at a potential of about 9.5 kv. The fluorescent X-ray spectrum of the crystal contains characteristic radiation of both potassium and chlorine which have wave-lengths lying close to and on either side of the absorption edge of chlorine (4.3938 A). X-radiation of wave-lengths longer than the wave-length of the absorption edge of chlorine is transmitted through the sheet with relatively little attenuation while the X-radiation of shorter wave-length is greatly attenuated in its passage through the sheet.

The emergent beam 6 comprising a mixture of those wave-lengths is then collimated by collimator 7 and enters proportional counter 8 which conventionally comprises a chamber having a window through which the radiation can enter, a pair of electrodes and an ionizable medium. A suitable potential is applied between the electrodes so that the entering radiation ionizes the medium and causes conduction proportional to the intensity of the radiation.

The output of the counter can be monitored directly by means of a cathode ray oscilloscope 9. Preferably, however, the output of the counter is coupled to a multi-channel pulse height analyzer 10 which separates pulses of different amplitudes into groups having definite amplitude intervals. By means of appropriate but conventional scaling circuits 11, the number of pulses per unit time in each amplitude interval are separately counted and recorded on a strip-chart recorder 12.

Since the thickness of the sample is proportional to the attenuation of the longer wave-length radiation in its passage through the layer, comparison of the intensity of the radiation passing through the layer with that obtained by radiation of the same wave-length through a layer of known thickness enables the determination of thickness of the observed layer. For this purpose, a single determination on a layer of known thickness for comparison purposes is sufficient.

Alternatively, comparison with a sample having a known thickness may be dispensed with and the thickness may be calculated from the following equation:

$$I_x = I_0 e^{-(u/D) \cdot px}$$

or $$X = \frac{\log_e I_0 - \log_e I_x}{p^{(u/D)}}$$

wherein $I_x$ is the intensity of the longer wave length radiation after passage through the sample, $I_0$ is the intensity of the longer wave-length radiation before passage through the sample, $e$ is the natural base of logarithms, $u/p$ is the mass-absorption coefficient of the layer, $p$ is the density of the layer and $x$ is the thickness of the layer.

In determining the chlorine content of the layer (or the content of any other element in a similar layer) the following relationship is useful.

If $I_2$ is the intensity of the emergent beam having wave-lengths shorter than the absorption edge; and $I_1$ is the intensity of the emergent beam having wave-lengths longer than the absorption edge; then $$\frac{I_2}{I_1} = e^{-cP} \quad \text{or} \quad P = \frac{1}{c}(\log_e I_1 - \log_e I_2)$$

where P is the amount of chlorine in the layer, $e$ is the base of natural logarithms, and $c$ is an experimentally determined constant which can be determined from a sample of known composition.

It will thus be seen that the useful information derived from the passage of the two wave-lengths of X-radiation through the layer readily enables the determination of both its thickness and composition. Obviously, this information may be employed in a conventional manner to the control of the layer thickness and composition by a suitable slave device. The method described is not only applicable to thin layers of the aforesaid materials but may be applied to the determination of the thickness and composition of metal layers, paint films, layers of glass, layers of polytetrofluorethylene polymer and many other materials.

Therefore, while I have described my invention with reference to specific examples and applications thereof, I do not wish to be limited thereto and desire that the appended claims be construed as broadly as possible in view of the prior art.

What I claim is:

1. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, means to detect the emergent beam of X-radiation from said layer, and means to measure the intensity of each of said wave-lengths in the emergent beam to thereby determine the amount of said element in and the thickness of said layer.

2. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, means to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam to thereby determine the thickness of and the amount of said element in said layer.

3. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam to thereby determine the thickness of and the amount of said element in said layer.

4. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam and means coupled to said proportional counter for counting the number of pulses in a given amplitude interval to thereby determine the thickness of and the amount of said element in said layer.

5. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said portion and produce electrical pulses of amplitudes inversely proportional to wave-lengths in the emergent beam and of a number in each amplitude interval proportional to the intensity of the corresponding wave-length in the emergent beam, and a cathode ray oscilloscope whereby the number of pulses in a given amplitude interval is counted and thereby the thickness of and the amount of said element in said layer is determined.

6. Apparatus for determining the composition and thickness of a thin layer comprising a dual source of X- radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam, means coupled to said proportional counter for separating the pulses according to their amplitudes and means coupled to said pulse separation means for counting the number of pulses in a given amplitude interval to thereby determine the thickness of and the amount of said element in said layer.

7. Apparatus for determining the composition and thickness of a think layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam, a pulse height analyzer for separating the pulses according to their amplitudes and means coupled to said pulse height analyzer, for counting the number of pulses in a given amplitude interval to thereby determine the thickness of and the amount of said element in said layer.

8. Apparatus for determining the composition and thickness of a thin layer comprising a dual source of X-radiation having X-ray spectra one of which includes a characteristic wave-length adjacent to and longer than the absorption edge of an element in said layer and the other of which includes a characteristic wave-length adjacent to and shorter than said absorption edge, means to position a portion of said layer in the path of said X-radiation, a proportional counter to detect the emergent beam of X-radiation from said layer and produce electrical pulses of amplitudes inversely proportional to wave-lengths in the emergent beam and of a number in each amplitude interval proportional to the intensity of the corresponding wave-length in the emergent beam, a pulse height analyzer for separating the pulses according to their amplitudes and means coupled to said pulse height analyzer, for counting the number of pulses in a given amplitude interval, a strip chart recorder coupled to the counting means for recording the number of pulses in a given amplitude interval whereby the thickness of and the amount of said element in said layer is determined.

9. Apparatus for determining the composition and thickness of a thin layer comprising a polychromatic source of X-radiation, a secondary radiator positioned to intercept a portion of the X-radiation from said polychromatic source and containing at least two elements each adapted to be excited into generating fluorescent X-radiation of its characteristic wave-length, one of said elements in each secondary radiator having a characteristic wave-length lying adjacent to and longer than the absorption edge of an element in said layer and the other of said elements in said secondary radiator having a characteristic wave-length lying adjacent to and shorter than the absorption edge of said element in said layer, means to position a portion of said layer in the path of said fluorescent X-radiation, means to detect the emergent beam of X-radiation from said layer, and means to measure the intensity of each of said wave-lengths in the emergent beam to thereby determine the amount of said element in and the thickness of said layer.

References Cited in the file of this patent
UNITED STATES PATENTS 2,542,822 Longini _____ Feb. 20, 1951
2,659,823 Vossberg _____ Nov. 17, 1953

OTHER REFERENCES

Chemical Analysis by X-Ray Absorption, by Liebhafsky et al., General Electric Review, April, 1945, pages 36 to 39.

Analytical Methods Based on X-Ray Absorption, Liebhafsky, Analytical Chemistry, vol. 25, January-June, 1953, pages 689 to 692.

X-Ray Absorption and Emission, Liebhafsky, vol. 26, January-June, 1954, pages 26 to 31.